(12) United States Patent
Smith et al.

(10) Patent No.: US 11,593,302 B2
(45) Date of Patent: *Feb. 28, 2023

(54) METHODS, SYSTEMS, AND COMPUTER READABLE MEDIUMS FOR IMPLEMENTING A DATA PROTECTION POLICY FOR A TRANSFERRED ENTERPRISE APPLICATION

(71) Applicant: EMC IP HOLDING COMPANY LLC

(72) Inventors: Gregory Lawrence Smith, Mount Laurel, NJ (US); Michael Barcello, Pittsboro, NC (US)

(73) Assignee: EMC IP Holding Company LLC, Round Rock, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/008,280

(22) Filed: Aug. 31, 2020

(65) Prior Publication Data

US 2020/0401556 A1 Dec. 24, 2020

Related U.S. Application Data

(63) Continuation of application No. 14/584,139, filed on Dec. 29, 2014, now Pat. No. 10,795,856.

(51) Int. Cl.
*G06F 16/13* (2019.01)
*G06F 11/14* (2006.01)
*G06F 16/21* (2019.01)

(52) U.S. Cl.
CPC .......... *G06F 16/13* (2019.01); *G06F 11/1464* (2013.01); *G06F 16/21* (2019.01)

(58) Field of Classification Search
CPC ....... G06F 16/13; G06F 16/21; G06F 11/1464
(Continued)

(56) References Cited

U.S. PATENT DOCUMENTS 7,757,214 B1 * 7/2010 Palczak ................. G06F 9/5083
717/121
7,827,150 B1 * 11/2010 Wu ........................ G06F 16/164
707/672

(Continued)

OTHER PUBLICATIONS

Notice of Allowance and Fee(s) Due for U.S. Appl. No. 14/584,139 (dated Jun. 4, 2020).

(Continued)

*Primary Examiner* — Mark E Hershley
(74) *Attorney, Agent, or Firm* — Jenkins, Wilson, Taylor & Hunt, P.A.

(57) ABSTRACT

Methods, systems, and computer readable mediums for logically remediating infrastructure resource components are disclosed. According to one example, the method includes capturing metadata specifying both a data protection policy applied to an enterprise application supported by a host computing system and a location of backup file data associated with the enterprise application and transferring the enterprise application and the metadata from the host computing system to a target computing system. The method further includes utilizing the metadata to reconstruct the data protection policy for the transferred enterprise application on the target computing system, wherein the metadata specifies a data protection solution for each of a plurality of resource components supporting the transferred enterprise application on the target computing system.

17 Claims, 3 Drawing Sheets

(58) Field of Classification Search
USPC .......................................................... 707/654
See application file for complete search history.

(56) References Cited

U.S. PATENT DOCUMENTS

| | | | | |
|---|---|---|---|---|
| 7,987,152 B1* | 7/2011 | Gadir | G06F 16/256 | 707/602 |
| 8,233,600 B1* | 7/2012 | Weinberg | G06Q 50/188 | 709/200 |
| 8,458,422 B1* | 6/2013 | Holdman | G06F 11/1479 | 711/E12.001 |
| 8,903,777 B1* | 12/2014 | Searls | G06F 16/11 | 707/665 |
| 8,930,653 B1* | 1/2015 | Chatterjee | G06F 3/0689 | 711/159 |
| 9,043,786 B1* | 5/2015 | Hodge | G06F 9/5077 | 718/1 |
| 9,081,617 B1* | 7/2015 | Pendharkar | G06F 9/45558 | |
| 9,088,570 B2* | 7/2015 | Anderson | H04L 67/10 | |
| 9,111,088 B2* | 8/2015 | Ghai | G06F 21/55 | |
| 9,116,812 B2* | 8/2015 | Joshi | G06F 3/0644 | |
| 9,118,689 B1* | 8/2015 | Apte | H04L 63/08 | |
| 9,477,693 B1* | 10/2016 | Bachu | G06F 11/1448 | |
| 9,483,490 B1* | 11/2016 | Iyengar | G06F 16/119 | |
| 9,485,271 B1* | 11/2016 | Roundy | H04L 63/1441 | |
| 9,495,188 B1* | 11/2016 | Ettema | H04L 63/0245 | |
| 9,600,386 B1* | 3/2017 | Thai | H04L 41/12 | |
| 9,639,589 B1* | 5/2017 | Theimer | G06F 21/00 | |
| 9,967,159 B2* | 5/2018 | Shroff | H04L 43/04 | |
| 10,795,856 B1* | 10/2020 | Smith | G06F 11/1458 | |
| 2001/0018729 A1* | 8/2001 | Johnson | G06F 11/1076 | 714/E11.034 |
| 2003/0115484 A1* | 6/2003 | Moriconi | H04L 63/1408 | 726/1 |
| 2004/0054918 A1* | 3/2004 | Duri | G06Q 20/382 | 705/64 |
| 2004/0098285 A1* | 5/2004 | Breslin | G06Q 10/10 | 713/193 |
| 2006/0074618 A1* | 4/2006 | Miller | G06F 11/3664 | 703/13 |
| 2006/0173672 A1* | 8/2006 | Bergeron | G06F 40/20 | 704/9 |
| 2006/0179061 A1* | 8/2006 | D'Souza | G06F 16/283 | |
| 2007/0143851 A1* | 6/2007 | Nicodemus | H04L 63/1433 | 726/4 |
| 2007/0226535 A1* | 9/2007 | Gokhale | G06F 16/2365 | 714/6.12 |
| 2008/0086564 A1* | 4/2008 | Putman | H04L 67/51 | 709/227 |
| 2008/0243953 A1* | 10/2008 | Wu | G06F 11/1453 | |
| 2008/0256593 A1* | 10/2008 | Vinberg | G06Q 10/06 | 726/1 |
| 2009/0241192 A1* | 9/2009 | Thomas | G06F 9/5077 | 718/1 |
| 2009/0254572 A1* | 10/2009 | Redlich | G06Q 10/06 | |
| 2009/0313620 A1* | 12/2009 | Sedukhin | G06F 9/45558 | 718/1 |
| 2010/0070725 A1* | 3/2010 | Prahlad | G06F 11/1453 | 718/1 |
| 2011/0022812 A1* | 1/2011 | van der Linden | H04L 69/08 | 711/E12.001 |
| 2011/0225123 A1* | 9/2011 | D'Souza | H04L 67/1034 | 707/634 |
| 2012/0096269 A1* | 4/2012 | McAlister | H04L 63/061 | 713/171 |
| 2012/0203742 A1* | 8/2012 | Goodman | G06F 16/128 | 707/649 |
| 2012/0254353 A1* | 10/2012 | Baba | H04L 12/4641 | 709/217 |
| 2013/0018765 A1* | 1/2013 | Fork | H04L 61/2592 | 705/34 |
| 2013/0097597 A1* | 4/2013 | Gibson | G06F 9/45533 | 717/177 |
| 2013/0097709 A1* | 4/2013 | Basavapatna | H04L 63/1441 | 726/25 |
| 2013/0173771 A1* | 7/2013 | Ditto | G06F 11/1438 | 709/223 |
| 2013/0232497 A1* | 9/2013 | Alagam | G06F 9/5072 | 718/104 |
| 2013/0232498 A1* | 9/2013 | Mangtani | G06F 9/5077 | 718/104 |
| 2013/0304693 A1* | 11/2013 | Jaeger | G06F 16/254 | 707/602 |
| 2014/0007222 A1* | 1/2014 | Qureshi | H04L 67/10 | 726/16 |
| 2014/0181893 A1* | 6/2014 | Von Bokern | H04L 63/0876 | 726/1 |
| 2014/0196105 A1* | 7/2014 | Hung | H04L 63/20 | 726/1 |
| 2014/0200036 A1* | 7/2014 | Egner | H04W 64/00 | 455/456.3 |
| 2014/0201157 A1* | 7/2014 | Pawar | G06F 16/21 | 707/654 |
| 2014/0280961 A1* | 9/2014 | Martinez | H04L 41/40 | 709/226 |
| 2014/0351635 A1* | 11/2014 | Madani | G06F 11/0709 | 714/15 |
| 2015/0089497 A1* | 3/2015 | Borzycki | G06F 9/45533 | 718/1 |
| 2015/0128133 A1* | 5/2015 | Pohlmann | G06F 9/455 | 718/1 |
| 2015/0142751 A1* | 5/2015 | Bruce | G06F 16/2471 | 707/662 |
| 2015/0142949 A1* | 5/2015 | Nair | H04L 67/10 | 709/224 |
| 2015/0220553 A1* | 8/2015 | Poon | G06F 16/2452 | 707/722 |
| 2016/0105488 A1* | 4/2016 | Thakkar | G06F 9/45558 | 709/217 |
| 2016/0132214 A1* | 5/2016 | Koushik | G06F 8/61 | 715/741 |
| 2016/0134616 A1* | 5/2016 | Koushik | G06F 21/335 | 726/9 |

OTHER PUBLICATIONS

Notice of Panel Decision from Pre-Appeal Brief Review for U.S. Appl. No. 14/584,139 (Feb. 14, 2020).
Advisory Action Before the Filing of an Appeal Brief for U.S. Appl. No. 14/584,139 (dated Dec. 31, 2019).
Final Office Action for U.S. Appl. No. 14/584,139 (dated Sep. 30, 2019).
Non-Final Office Action for U.S. Appl. No. 14/584,139 (dated May 30, 2019).
Advisory Action Before the Filing of an Appeal Brief for U.S. Appl. No. 14/584,139 (dated Mar. 11, 2019).
Final Office Action for U.S. Appl. No. 14/584,139 (dated Nov. 29, 2018).
Non-Final Office Action for U.S. Appl. No. 14/584,139 (dated May 3, 2018).
Advisory Action Before the Filing of an Appeal Brief for U.S. Appl. No. 14/584,139 (dated Apr. 2, 2018).
Final Office Action for U.S. Appl. No. 14/584,139 (dated Dec. 28, 2017).
Non-Final Office Action for U.S. Appl. No. 14/584,139 (dated May 4, 2017).

* cited by examiner

METHODS, SYSTEMS, AND COMPUTER READABLE MEDIUMS FOR IMPLEMENTING A DATA PROTECTION POLICY FOR A TRANSFERRED ENTERPRISE APPLICATION

PRIORITY CLAIM

This application is a continuation of U.S. patent application Ser. No. 14/584,139 filed Dec. 29, 2014, the disclosure of which is incorporated herein by reference in its entirety.

TECHNICAL FIELD

The subject matter described herein relates to data protection measures. More specifically, the subject matter relates to methods, systems, and computer readable mediums for implementing a data protection policy for a transferred enterprise application.

BACKGROUND

Presently, information technology (IT) departments utilize various software application products to transfer enterprise applications (e.g., an online banking application, securities trading application, etc.) from one computing system to another. Application transfers can be conducted either within a single data center facility or between two or more data center facilities separated by some geographical distance. Regardless of the computing system an enterprise application physically resides, application data requires some degree of protection at its current host location. The level of data protection afforded by the host computing system is largely dependent on the value and sensitivity of the stored application data. While the transfer of application data may be conducted for any number of practical and strategic reasons, such a procedure is not without inherent drawbacks. Namely, the transfer of application data in an enterprise setting often requires the rebuilding of data protection policies associated with the transferred application data. In addition, any transfer of application data conducted during a backup file retention period can compel an application restoration process to become a challenging endeavor.

SUMMARY

Methods, systems, and computer readable mediums for implementing a data protection policy for a transferred enterprise application are disclosed. According to some embodiment, the method includes obtaining metadata specifying both a data protection policy applied to an enterprise application supported by a host computing system and a location of backup file data associated with the enterprise application and transferring the enterprise application and the metadata from the host computing system to a target computing system. The method further includes utilizing the metadata to reconstruct the data protection policy for the transferred enterprise application on the target computing system, wherein the metadata designates a data protection solution for each of a plurality of resource components supporting the transferred enterprise application on the target computing system.

BRIEF DESCRIPTION OF THE DRAWINGS

The subject matter described herein will now be explained with reference to the accompanying drawings of which.

DETAILED DESCRIPTION

Figure 1:
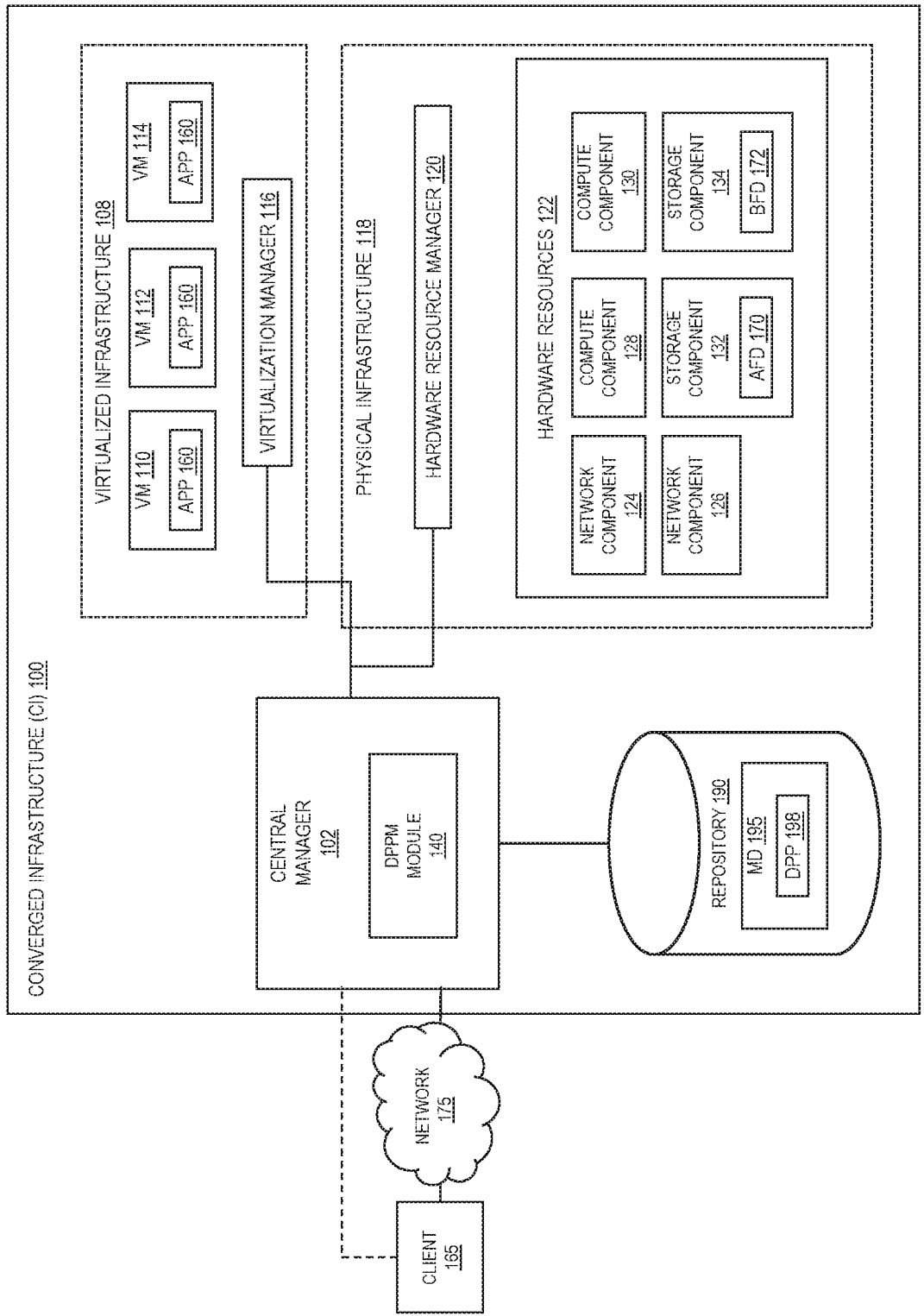
FIG. 1 illustrates logical block diagram representation of an exemplary converged infrastructure in accordance with embodiments of the subject matter described herein.

The subject matter described herein discloses methods, systems, and computer readable mediums for implementing a data protection policy for a transferred enterprise application. In some embodiments, the disclosed subject matter includes an application that has been designated for transfer from a supporting host computing system to a target computing system. As used herein, an 'application' may refer to an enterprise application (e.g., an on-line banking system application) that is hosted and executed across both a physical environment and a virtual environment. For example, the physical environment may comprise resource components such as compute components, storage components, and networking components that are collectively configured to host virtual machines (in a virtual environment) that facilitate and implement the enterprise application. The resource components may also be configured to store file data associated with the enterprise application. Notably, the enterprise application is typically subjected to a single data protection policy that is applied to the application as a whole, but may be implemented on each resource component in varying ways.

Notably, the host computing system may execute a data protection policy management (DPPM) module that accesses data protection policy metadata which specifies both i) a data protection policy that is currently applied to the enterprise application designated for transfer and ii) the location(s) of backup file data associated with the enterprise application. As used herein, a data protection policy may involve one or more of the following: periodic backups, synchronous data replication, asynchronous data replication, and business continuity measures. Afterwards, the DPPM module may be utilized to transfer the enterprise application and the data protection policy metadata from the host computing system to the target computing system designated as the destination. Upon receipt of the data protection policy metadata and the application file data, the target computing system may utilize the metadata to reconstruct the data protection policy (e.g., on the target computing system itself) for the transferred enterprise application. Notably, the data protection policy metadata may designate a data protection solution to be implemented for each of a plurality of resource components (e.g., compute components, storage components, etc.) supporting the transferred enterprise application on the target computing system.

In accordance with some embodiments of the disclosed subject matter, functionality for implementing a data protection policy for a transferred enterprise application can involve interacting with one or more converged infrastructure (CI) systems, such as an integrated infrastructure system (e.g., a Vblock® System from VCE Company, LLC), and/or computing system resource components contained therein. For example, a CI system can include a single computing platform unit associated with racks of physical CI components and related software for performing virtualization, cloud computing, and/or other information technology (IT) functions. Moreover, a CI system can comprise multiple computing system resource components, such as physical resources and/or virtual resources, in a preconfigured or prepackaged computing platform, where some resource components are developed and/or manufactured by multiple entities. For example, an exemplary CI system can comprise data storage devices, servers (e.g., web servers, file servers, etc.), networking equipment, and software for managing physical resources and/or virtualized resources (e.g., virtual servers). Although the following disclosure describes the use of one or more CI systems, any integrated infrastructure system or device can be utilized without departing from the scope of the present subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a logical block diagram representation of an exemplary CI system, generally represented as CI 100, according to an embodiment of the subject matter described herein. Although the following disclosure describes the use of CI 100, any type of computing system can be utilized without departing from the scope of the present subject matter. CI 100 may comprise multiple computing system resource components, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CI systems), a virtual machine, a virtual server, a virtual storage device, a virtual port, and/or a virtual communications interface. CI 100 can also comprise software and related components for managing the CI system and/or component portions (e.g., computing system resource components) therein.

More specifically, CI 100 in FIG. 1 includes a central manager 102, a repository 190, a virtualized infrastructure 108, and a physical infrastructure 118. In some embodiments, central manager 102 can be configured to communicate with various resource components and/or manage various resource components in CI 100. More specifically, central manager 102 can be configured to manage performance, resource utilization levels, application data recovery, and other aspects associated with resource components included in virtualized infrastructure 108 and/or physical infrastructure 118. In some embodiments, central manager 102 can comprise VCE Vision™ Intelligent Operations software and/or firmware.

In some embodiments, central manager 102 can include (and/or interact with) a data protection policy management (DPPM) module 140. DPPM module 140 may comprise any suitable entity (e.g., hardware, firmware, and/or software executing on a processor) for implementing a data protection policy for a transferred enterprise application. For example, DPPM module 140 can be configured to procure and manage data protection policy metadata (see below) that specifies both i) a data protection policy that is applied to an enterprise application supported by a host computing system (e.g., CI 100) and ii) the location(s) of backup file data associated with the enterprise application. DPPM module 140 may also be configured to transfer the enterprise application and the metadata from the host computing system to a target computing system. In such a scenario, the DPPM module on the destination CI may utilize the received metadata to reconstruct a data protection policy for the transferred enterprise application on the receiving target computing system. Notably, the data protection policy may further specify data protection solutions that can be used by DPPM module 140 for each of the resource components supporting the transferred enterprise application on the target computing system. More specifically, DPPM module 140 may be configured to implement the data protection policy solutions on the resource components at a per-component level.

As indicated above, CI 100 may include a repository 190, which in turn may comprise any data storage unit (e.g., a database or plurality of databases) that can be configured to store data protection policy related information, such as data protection policy metadata 195 and at least one data protection policy 198. Although FIG. 1 depicts repository 190 as a local data storage unit residing on CI 100, repository 190 can also be embodied as a data storage unit located at an online location (e.g., a public distributed content site), on a local proxy server in a customer's or system administrator's environment, or on a different CI system without departing from the scope of the disclosed subject matter. Moreover, repository 190 can be implemented using one or more computing platforms, devices, or systems. In some embodiments, the data protection policy metadata 195 also comprises data protection policy information 198 that identifies all of the resource components supporting an enterprise application 160 (described in further detail below) that are subjected to a particular data protection policy. Although FIG. 1 depicts metadata 195 being contained in a local repository 190, metadata may be stored with resource components designated to support the enterprise application file data as part of a descriptor file, stub file, stub or other data entity. For example, metadata 195 may identify both the virtual machines (e.g., VMs 110-114 as described in detail below) and the underlying physical resource components (e.g., one or more of hardware resources 122 as described in detail below) that are utilized to support the enterprise application 160 hosted on CI 100. In addition to providing information that enables DPPM module 140 to keep track of the resource components that are subject to the data protection policy 198, metadata 195 also maintains a record of the location of the physical resource components (e.g., storage components) that store backup file data (e.g., backup file data 172) associated with the hosted enterprise application. For example, metadata 195 may include records indicating the file retention window or period (e.g., 30 retention period) for backup file data 172 and/or the established backup frequency (e.g., conduct backup procedure every 12 hours). If enterprise application 160 resides on the same computing system for the duration of the file retention window established by data protection policy 198, then backup file data 172 will contain all of the backup file data for application 160.

In the event an enterprise application is transferred to a destination computing system, such as CI 100, repository 190 can be provisioned with metadata information linked with said enterprise application from a second repository (e.g., from a sending host CI system). For example, metadata information can be obtained or copied from a second repository over network 175, using secure copy (SCP) protocol, file transfer protocol (FTP), secure file transfer protocol (SFTP), hypertext transfer protocol (HTTP), or any like protocol. In some embodiments, CI 100 and the second CI system can be located at a common site and can be communicatively connected by a wired or wireless connection. In such a configuration, repository 190 can be provisioned with data protection policy metadata information from the second CI system via the wired or wireless connection. It is understood that the provisioning of repository 190 with data protection policy metadata information using the exemplary methods described above can be conducted via any automated or automatic manner. In addition, data protection policy metadata information copied from a second repository and installed into repository 190 can utilize any form of transportable mediums, such as a compact disc (CD), flash memory, a universal serial bus (USB) device, and the like.

In some embodiments, enterprise applications 160 may be supported by several resources existing in both a virtualized infrastructure 108 and a physical infrastructure 118 of CI 100. For example, virtualized infrastructure 108 can comprise a virtualization environment configured to simulate components of a computing device, such as a processor, system memory, and a storage device, for executing one or more virtual machines (VMs), such as VM 110, VM 112, and VM 114. Each of VM 110, VM 112, and VM 114 can be configured to perform various functions and/or services, such as web server functions or cloud application services, and can interact with various nodes, components, and/or users. Notably, each of VMs 110-114 may be configured to support an enterprise application 160. Although FIG. 1 illustrates that each of each of VMs 110-114 supports at least a portion of an enterprise application 160 (e.g., an on-line banking application, a securities trading platform application, etc.), a single VM may be configured to host application 160 in its entirety without departing from the scope of the disclosed subject matter.

In some embodiments, virtualized infrastructure 108 can be associated with one or more virtual entities. Each virtual entity can be supported by one or more resource components. In some embodiments, virtualization manager 116 can allow logical entities to be created, deleted, or modified using an API and/or a GUI. Virtualization manager 116 can constitute any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs. In addition, virtualization manager 116 may be communicatively connected to central manager 102 via a system bus connection. Notably, virtualization manager 116 may receive data protection policy related information, inquiries, and instructions from DPPM module 140 via central manager 102.

Physical infrastructure 118 can comprise hardware resources 122, such as network components 124-126, compute components 128-130, and storage components 132-134. Hardware resources 122 can be communicatively connected to various other resource components in CI 100 and other entities. Hardware resources 122 can be configured for use by one or more virtual entities in virtualized infrastructure 108. In some embodiments, network components 124-126 (e.g., network switches) can be configured to enable communication between the resource components in CI 100.

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities (e.g., VMs 110-114) in virtualized infrastructure 108. In some embodiments, hardware resource manager 120 can comprise any management component or entity, such as a unified infrastructure manager (UIM) or a unified computing system (UCS) director entity, which is configured to provision the physical hardware of CI 100.

As indicated above, DPPM module 140 may be configured to manage a data protection policy for an enterprise application. As shown in FIG. 1, enterprise application 160 is being supported by the resource components of CI 100. Further, data protection policy metadata 195 contained in repository 190 includes a data protection policy 198 that specifies a general data protection solution that is applied to enterprise application 160. Notably, data protection policy 198 is created and designated at the application level. However, data protection policy 198 may also set forth the specific data protection policy measures to be applied to the different resource components supporting hosted enterprise application 160. More specifically, data protection policy 198 includes specified data protection policy implementation measures, methods, and/or solutions that are applied to each of the underlying resource components supporting the enterprise application 160. In general, an exemplary data protection policy applied to an enterprise application may try to achieve a recovery point objective utilizing a high level description. For example, a particular data protection policy at the application level may generally indicate i) a permissible amount of downtime for an enterprise application and ii) a threshold value indicating a permissible amount of data that can be lost. However, as set forth above, data protection policy 198 may define different implementation mechanisms that uniquely pertain to each resource component (or resource component type). For example, the data protection policy implementation mechanism may define a specific frequency for backing up application file data and/or define a specific file retention window. In one exemplary embodiment, a data protection policy implementation may indicate that a storage component 134 in CI 100 is responsible for backing up file data associated with enterprise application 160 every 12 hours. The data protection policy implementation may further indicate that the backup file data is retained for a predefined number of file retention iterations and/or a predefined number of days. Notably, in some embodiments, a single application may include multiple data protection policies. For example, a single enterprise application may utilize one or more of: i) a basic backup, ii) a backup replication to a second site (e.g., in the event a primary site is destroyed or disabled, iii) synchronous replication of data to a local and/or remote computing systems, iv) asynchronous replication of data to local and/or remote computing systems, v) compliance copies that are protected and/or stored in accordance to legal requirements, vi) litigation hold copies, vii) auto shred upon expiration, viii) high availability (e.g., zero downtime), and the like.

In some embodiments, metadata 195 may also establish a link between a data protection policy, a supported enterprise application, and that application's underlying resource components via the recordation and use of a unique identifier (ID). More specifically, one or more virtual and physical resource components in CI 100 may be identified and/or tagged using a unique ID (e.g., an alphanumeric identifier) that is also commonly shared with the supported enterprise application. That is, the unique identifier can serve as a logical nexus between application 160 and the supporting resource components (e.g., VMs 110-114 and components 128-134) designated by data protection policy 198. Namely, the unique identifier is attached to (or included within) data protection policy 198, thereby logically tying data protection policy 198 to the components supporting enterprise application 160. Such a logical link enables a system administrator to manage and/or change in the manner in which data protection policy 198 is applied to the supporting resource components.

In some embodiments, DPPM module 140 may utilize the unique identifier stored in metadata 195 to facilitate the transfer of an enterprise application (e.g., enterprise application 160) and its corresponding metadata (e.g., metadata 195) from CI 100 to another target destination. For example, DPPM module 140 may detect (e.g., via notification from central manager 102) that hosted enterprise application 160 has been designated to be transferred from CI 100 to another computing system (e.g., a target or destination CI). In such a scenario, DPPM module 140 may be configured to query repository 190 to access the data protection policy metadata 195 corresponding to enterprise application 160. Upon locating metadata 195, DPPM module 140 may be configured to transfer, from CI 100, application file data 170 (which is utilized to implement the VMs 110-114 serving as hosts for application 160) and metadata 195 to a target destination CI. Notably, the unique identifier may be utilized by DPPM module 140 to establish a link between metadata 195 and application file data 170 prior to the transfer of said data to the target destination. In some embodiments, transferred metadata 195 not only includes data protection policy 198 but also location information (e.g., IP address(es)) corresponding to the component(s) responsible for storing backup data files 172 (which are backup data of application file data 170). In some embodiments, application file data 170 and metadata 195 may be transferred in a separate manner by DPPM module 140 via independent methods and/or processes.

In the event application file data 170 (i.e., file data for enterprise application 160) is transferred to a second CI system functioning as the destination or target server, said second CI system may utilize its own DPPM module to conduct an assessment to determine if sufficient resources are available to support the received data protection policy. The DPPM module may compare the requirements included in the received data protection policy with the available resources contained in the target server. Using CI 100 as an example of a target CI system, resident DPPM module 140 may query virtualization manager 116 and hardware resource manager 120 in order to assess the availability and type of resources are present on CI 100 and whether the requirements of data protection policy 198 can be satisfied. For example, DPPM module 140 may be configured to communicate with the virtualized infrastructure 108 and physical infrastructure 118 in CI 100 via virtualization manager 116 to obtain assessment data regarding the virtual resources in CI 100 and hardware resource manager 120 to obtain assessment data regarding the physical resources in CI 100. In the event enterprise application 160 is transferred to a target CI, DPPM module 140 may utilize the unique ID included in application 160 to query repository 190 in order to access data protection policy metadata 195. Notably, metadata 195 may be accessed to determine the type of data protection associated with transferred application 160 and query virtualized infrastructure 108 and physical infrastructure 118 to determine if the CI system includes sufficient network resources as required by data protection policy 198. In the event the DPPM module 140 determines that CI 100 has sufficient resources to implement data protection policy 198, DPPM module 140 utilizes the transferred metadata to reconstruct the data protection policy measures on the target CI's resource components. In some embodiments, DPPM module 140 may reconstruct the data protection policy measures by designating resource components in CI 100 to support the transferred application and configuring said designated resources to comply with the specified data protection policy measures/solutions. In one embodiment, an enterprise application that is transferred may comprise a basic data protection policy that involves a single backup once per day with a backup retention period for 30 days. Notably, the respective backup computing systems at the original data center facility site and the new data center facility site has a "backup to disk" system (e.g., Avamar backup system). In the event the enterprise application is transferred to the new data center facility site, DPPM module 140 (in the computing system at the new site) may be configured to reconstruct the data protection policy via an application programming interface (API). For example, any backup procedure in which a backup system administrator or user can perform utilizing a user interface (e.g., a GUI or CLI) or code scripts, DPPM module 140 may be configured to execute via the API.

After enterprise application 160 is fully supported by CI 100, situations or conditions may arise where application 160 needs to be restored in part or in its entirety. In the event a restore or recovery procedure for a transferred enterprise application (e.g., suppose application 160 was transferred to CI 100) is initiated, DPPM module 140 may be configured to access metadata 195 to determine the associated data protection policy (e.g., data protection policy 198) for the enterprise application being restored (e.g., application 160). Notably, DPPM module 140 utilizes metadata 195 to determine the file retention periods established by data protection policy 198 and the network location (e.g., IP address) of the physical resource components storing the backup file data corresponding to the application data files 170 that support enterprise application 160. If DPPM module 140 determines that the restore procedure is being performed at a point in time in which the file retention period is exceeded by the amount of time the application has been supported by the host computing system, then metadata 195 will indicate that the backup file data (e.g., backup file data 172) is located entirely on CI 100 (e.g., the current host computing system). Otherwise, metadata 195 may indicate that the backup file data is stored in a distributive manner across a plurality of computing systems, such as the current CI system and the original host CI system. Notably, backup file data is typically not transferred with the application data so the location information contained in metadata 195 is critical to conducting a proper restoration of application 160. In some embodiments, DPPM module 140 may review the formerly transferred metadata 195 (now on CI 100) to determine the location of the "distributed" backup data. For example, DPPM module 140 may use a unique identifier to acquire IP addresses of storage components on the original host CI and issue request for the relevant backup file data. For any portion of the backup filed data that resides locally on CI 100 (as indicated by the file retention period), DPPM module 140 may instruct (via central manager 102 and/or hardware resource manager 120) to assign local hardware components to conduct the restoration.

In some embodiments, central manager 102 can include or utilize one or more communications interfaces, e.g., a GUI, a CLI, an API, or other interface, for receiving metadata query related information with a client entity 165. For example, client entity 165 (e.g., a user) can request, using a representation state transfer (REST) API related message, information about a particular CI or resource component associated with the support of an enterprise application. For example, client entity 165 can represent any entity (e.g., software executing on a processor, a web-based interface, etc.) for allowing a user (e.g., a human operator or an automated system) to interact with CI 100, resource components therein, and/or other entities. In some embodiments, client entity 165 can communicate directly with CI 100 with or without using communications network 175 (e.g., the Internet). In some embodiments, client entity 165 may be used to request audit information corresponding to metadata 195 or data protection policy 198. Likewise, client entity 165 may be utilized to change or modify aspects, features, or definitions associated with data protection policy 198.

In some embodiments, various entities depicted in FIG. 1 can be incorporated or implemented using one or more other entities depicted in FIG. 1. For example, DPPM module 140 can be incorporated in compute component 124, compute component 126, and/or a specialized device or compute component (e.g., an application management pod (AMP)). In another example, DPPM module 140 can be implemented using or located in an AMP and/or another device in physical infrastructure 118. In yet another example, virtualization software and/or virtualized components can be implemented using an AMP and/or another compute device (e.g., a blade appliance designated for some system management software). In some embodiments, each of the aforementioned compute components can comprise any type of hardware processor unit capable of executing computer executable instructions and/or software modules.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, a DPPM module 140 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

It will be appreciated that FIG. 1 is for illustrative purposes and that various components, their locations, and/or their functions as described above in relation to FIG. 1 can be changed, altered, added, or removed. For example, DPPM module 140 can comprise multiple, interacting software modules. Further, aspects of the disclosed subject matter can be implemented and/or located on any computing system or components therein.

Figure 2:
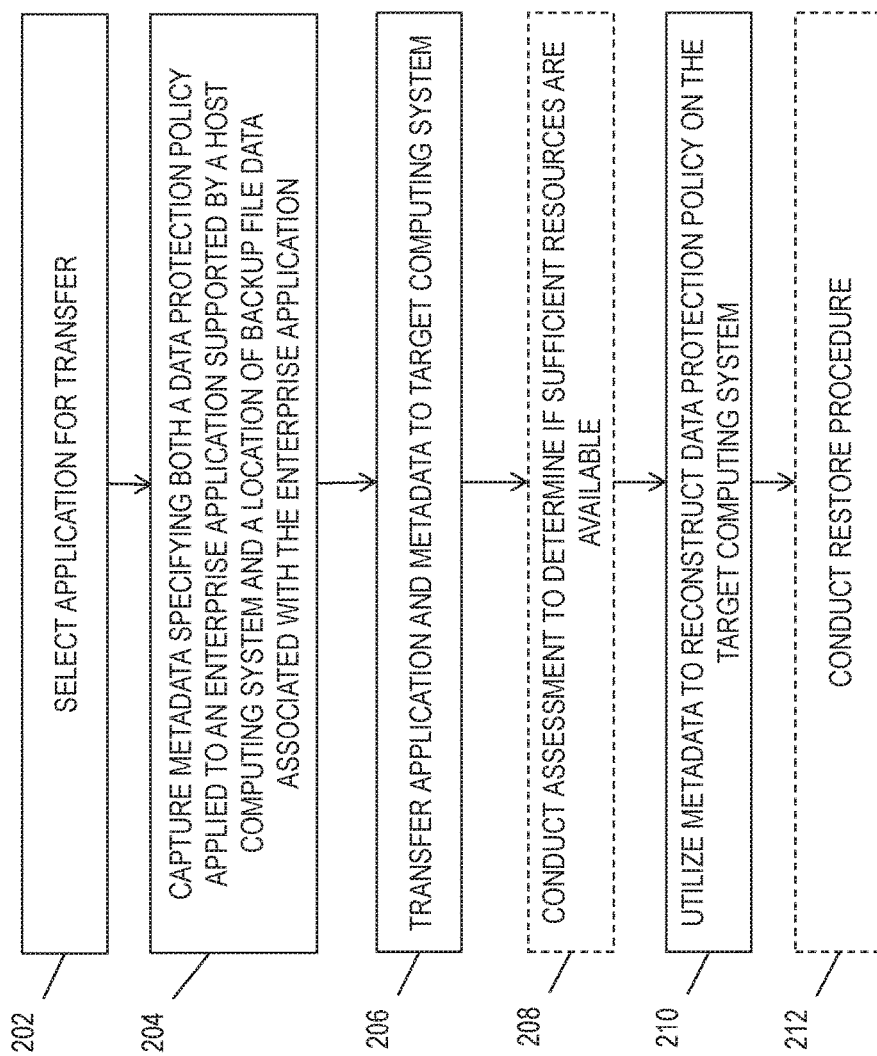
FIG. 2 illustrates a flow chart of an exemplary process for logically remediating infrastructure resource components in accordance with embodiments of the subject matter described herein.

FIG. 2 illustrates a flow chart of an exemplary method 200 for implementing a data protection policy for a transferred enterprise application in accordance with embodiments of the subject matter described herein. The description below with respect to method 200 further includes reference to FIG. 3 as an example of an enterprise application transfer between two CI systems. Although the following disclosure describes the implementation of a data protection policy on a CI system, the present subject matter can be applied to any computing system without departing from the scope.

At step 202, an enterprise application is selected for transfer. In some embodiments, a system administrator designates an enterprise application (e.g., an on-line banking application), which is currently being supported by one or more computing systems, to be transferred to one or more target computing systems. Referencing FIG. 3 for example, a host CI 302 may include a user interface (not shown) in which a system administrator may select or designate an enterprise application 322 for transfer from host CI 302 to target CI 402. Similar to the CI depicted in FIG. 1, host CI 302 in FIG. 3 comprises a central manager 304, a repository 306, a virtual infrastructure environment 312, and a physical infrastructure environment 314. Each of these elements is identical to their counterparts described above in regard to FIG. 1. In addition, central manager 304 may include a DPPM module 308, repository 306 may include metadata 320 and data protection policy 310. Lastly, virtual environment 312 includes supported application 322 and physical environment 314 includes application file data 324 and backup file data 326. Likewise, target CI 402 in FIG. 3 has similar elements and components as host CI 302.

At step 204, metadata specifying both a data protection policy applied to an enterprise application supported by a host computing system and a location of backup file data associated with the enterprise application is captured. In some embodiments, the type of data protection applied to the enterprise application is identified. For example, the current host computing system may be configured to locate a data protection policy that is utilized by the enterprise application. Returning to FIG. 3, a central manager 304 (e.g., VCE Vision) on host CI 300 may utilize a data protection policy management (DPPM) module 308 to query a local repository 306 in order to access metadata 320. In some embodiments, DPPM module 308 utilizes a unique identifier associated with the selected application to access the appropriate metadata 320. Metadata 320 may include a data protection policy 310 that is employed and applied to enterprise application 322 at an application level. Specifically, data protection policy 310 may comprise data that identifies the different data protection measures or solutions applied to each resource component that is utilized by host CI 302 to support enterprise application 322. For example, the data protection measure utilized by a compute component supporting application 322 may differ in scope from the data protection measure utilized by a storage component supporting application 322.

Similarly, the aforementioned capturing of metadata (i.e., step 204) may include the determination of the location of the data protection backup. In some embodiments, the accessed metadata (e.g., metadata 320) may also contain address information (e.g., IP address information corresponding to a storage component in physical environment 314) corresponding to the location(s) of backup and/or replication data files 326 associated with enterprise application 322. Notably, the metadata 320 may also include a record of file retention period information associated with each data file backup location.

Figure 3:
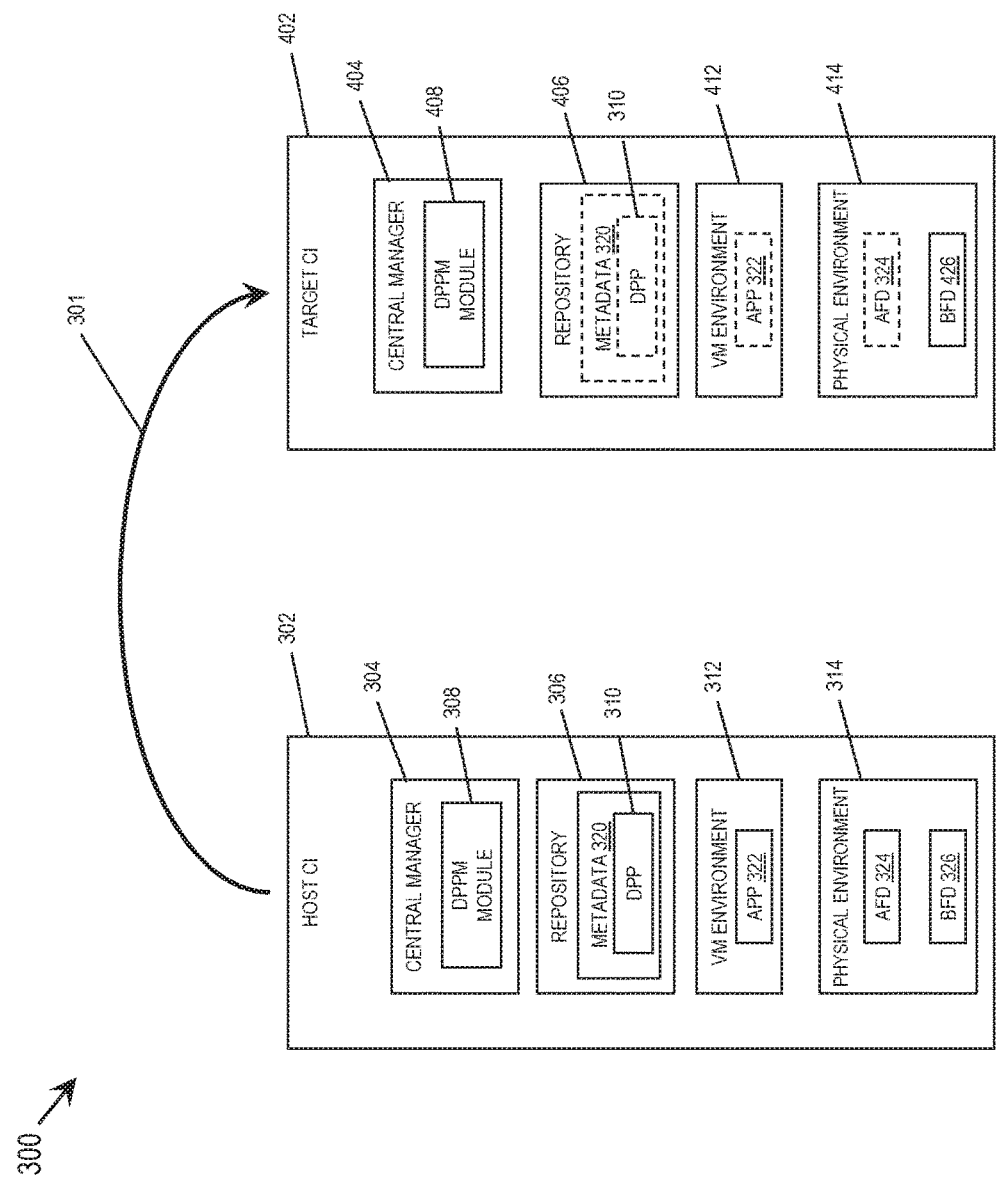
FIG. 3 illustrates a logical block diagram representation an exemplary converged infrastructure host system transferring an enterprise application to a converged infrastructure target system in accordance with embodiments of the subject matter described herein.

At step 206, the enterprise application and associated metadata are transferred. As indicated above, the enterprise application and associated metadata may be logically linked via the unique identifier. For example, metadata 320 and application file data 324 may be transferred from the host CI 302 to target CI 402 via transfer communication 301. Specifically, application file data 324, which comprises the underlying file data for executing application 322, is transferred from physical environment 314 (e.g., one or more storage components on host CI 302) to physical environment 414 on target CI 402. Notably, as a result of application file data 324 being transferred to physical environment 414, target CI 402 is able to implement the transferred enterprise application 322 on virtual machines executed within its own VM environment 412. This virtual machine implementation effectively facilitates the transfer of application 322 from host CI 302 to target CI 402. Although FIG. 3 depicts the transfer of metadata and application data to a single destination CI system (e.g., target CI 402), metadata 320, application file data 324, and application 322 may be distributed across a plurality of target CI systems without departing from the scope of the disclosed subject matter. In such a scenario, one central manager (e.g., central manager 404) may be designated as a primary central manager responsible for coordinating the data protection management of application 322 among the remaining plurality of central managers on the target CI systems.

At step 208, an assessment may be optionally conducted to determine if sufficient resources to support the backup policies on the target computing system are available. In some embodiments, a central manager 404 on target CI 402 may be configured to utilize a local DPPM module 408 to query a hardware manager in physical environment 414 to determine the status of the resident physical resource components, which will be utilized to support the transferred enterprise application 322. Such component status information may include the number, the health (e.g., operational status), and the availability of the compute components, storage components, and networking components included in physical environment 414. After acquiring the component status information, central manager 404 may compare the component status information to the data protection policy requirements set forth in the received metadata 320.

In some embodiments, suppose an enterprise application is associated with a data protection policy comprising i) a daily backup, ii) a retention period of 30 days, and iii) configured to replicate application data synchronously. In accordance to such a data protection policy, DPPM module 140 may determine that the enterprise application requires 2 TB of backup capacity, 2 TB of offsite backup replication capacity, and 40 MB of application data synchronous replication capacity. In one scenario, DPPM module 140 (on the target computing system) may be configured to query the resource components of the target computing system and determine that the components are currently below the 70% capacity threshold value (e.g., a selectable threshold). DPPM module 140 may further determine that there is 2 TB of backup capacity, 2 TB of offsite backup replication capacity, and 40 MB of application data synchronous replication capacity available. In response to such a determination, DPPM module 140 may be configured to apply the data protection policy via API calls. If DPPM module 140 ascertains that there is inadequate capacity, then an alert signal or message indicating the specific policy that could not be satisfied would be sent/activated. Similarly, in some embodiments, the determination for sufficient performance capabilities of the resource components of a computing system may be conducted by DPPM module 140. For example, DPPM module 140 may be configured to analyze the system rated metrics in addition to prior workload metrics.

At step 210, the received metadata may be utilized to reconstruct the data protection policy on the target computing system. In some embodiments, central manager 404 utilizes DPPM module 408 to analyze data protection policy 310 included in the previously received metadata 320. As indicated above, a data protection policy includes the specific data protection policy measures and/or solutions applied to each type of resource component that is utilized to support the backup data of the transferred enterprise application 322. Accordingly, DPPM module 408 applies a respective data protection policy measure (as indicated in data protection policy 310) to each of the resource components in physical environment 414 that are designated to support the backup solution to the transferred application 322.

At step 212, a restore or recovery procedure may be conducted (i.e., an optional step). In some embodiments, in the event an application restore procedure is needed, central manager 404 queries metadata 320 in repository 406 to determine the location of the backup file data for (previously transferred) enterprise application 322. As described above, metadata 320 may include a record of the location(s) (e.g., IP addresses) of backup and/or replication data for enterprise application 322. Depending on the file retention period associated with application 322, the backup file data may be distributed over a plurality of computing systems or CIs (e.g., both backup data 326 on original host CI 302 and backup data 426 on CI 402). For example, if i) data protection policy 310 (in repository 406) of application 322 specifies a file retention period of 30 days and ii) application 322 was transferred to target CI 402 (i.e., the "new host" CI) within the past 30 days, then all or part of the necessary backup file data to conduct a restoration may reside on two or more CI locations (e.g., both former host CI 302 and CI 402). As such, metadata 320 in repository 406 may be configured to contain and organize such distributed backup file data information.

As an example, consider the scenario where the data protection policy associated with transferred application 322 specifies that the file retention period is 30 days. In the event application 322 was last backed up on January $1^{st}$ on host CI 302, the transfer of application 322 to target CI 402 was conducted on the January $5^{th}$, and a restoration procedure of enterprise application 322 is requested on January $10^{th}$, then all or a portion of the backup file data associated with transferred application 322 would be distributed on both host CI 302 (e.g., backup file data 326 for January $1^{st}$-$5^{th}$) and CI 402 (e.g., local backup file data 426 for January $5^{th}$-$10^{th}$). Using this backup file data location information contained in metadata 320, central manager 404 may communicate with central manager 304 in order to facilitate the transfer (and/or access) of all or a portion of backup file data 326 (i.e., portion of January $1^{st}$-$5^{th}$) from CI 302 to CI 402. Once the backup file data (e.g., backup file data 326) is provisioned on CI 402, DPPM module 408 may conduct the application restoration process (i.e., using transferred backup file data 326 and backup file data 426)

It should be noted that a computing system executing DPPM module 140 and/or functionality described herein can constitute a special purpose computing system. Further, DPPM module 140 and/or functionality described herein can improve the technological field of computing system restoration and recovery processes via the dynamic management of backup file data pertaining to one or more computing systems, CI systems, and/or resource components therein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for implementing a data protection policy for a transferred enterprise application, the method comprising:
    capturing metadata specifying both a data protection policy applied to an enterprise application supported by a host computing system and a location of backup file data associated with the enterprise application;
    transferring the enterprise application and the metadata from the host computing system to a target computing system; and
    utilizing the metadata to reconstruct the data protection policy for the transferred enterprise application on the target computing system, wherein the metadata specifies a data protection solution for each of a plurality of hardware components supporting the transferred enterprise application on the target computing system, wherein the target computing system includes a data protection policy management module that is configured to assess whether the plurality of hardware components on the target computing system is able to implement the data protection policy by comparing requirements included in the data protection policy with available physical resources in the target computing system, and wherein the data protection policy management module is configured to reconstruct the data protection policy by designating the available physical resources in the target computing system to support the transferred enterprise application and to comply with the data protection policy.

2. The method of claim 1 wherein each of the host computing system and the target computing system is a converged infrastructure (CI) system.

3. The method of claim 1 comprising utilizing the transferred metadata to restore at least a portion of the transferred enterprise application on the target computing system.

4. The method of claim 1 wherein the data protection policy comprises, for each of the plurality of hardware components, a data protection solution that comprises at least one of a periodic backup, a synchronous data replication process, an asynchronous data replication process, or a business continuity measure.

5. The method of claim 1 wherein the data protection solutions for each of the plurality of hardware components is recorded in the metadata.

6. The method of claim 5 wherein the data protection solution for each of the plurality of hardware components maintains the location of backup file data in accordance with a backup file retention period.

7. A system for logically remediating infrastructure resource components, the system comprising:
    at least one processor;
    memory; and
    a data protection policy management (DPPM) module utilizing the at least one processor and memory, wherein the DPPM module is configured to:
        capture metadata specifying both a data protection policy applied to an enterprise application supported by a host computing system and a location of backup file data associated with the enterprise application;
        transfer the enterprise application and the metadata from the host computing system to a target computing system; and
        utilize the metadata to reconstruct the data protection policy for the transferred enterprise application on the target computing system, wherein the metadata specifies a data protection solution for each of a plurality of hardware components supporting the transferred enterprise application on the target computing system, wherein the target computing system includes a data protection policy management module that is configured to assess whether the plurality of hardware components on the target computing system is able to implement the data protection policy by comparing requirements included in the data protection policy with available physical resources in the target computing system, and wherein the data protection policy management module is configured to reconstruct the data protection policy by designating the available physical resources in the target computing system to support the transferred enterprise application and to comply with the data protection policy.

8. The system of claim 7 wherein each of the host computing system and the target computing system is a converged infrastructure (CI) system.

9. The system of claim 7 wherein the DPPM module is further configured to utilize the transferred metadata to restore at least a portion of the transferred enterprise application on the target computer system.

10. The system of claim 7 wherein the data protection policy comprises, for each of the plurality of hardware components, a data protection solution that comprises at least one of a periodic backup, a synchronous data replication process, an asynchronous data replication process, or a business continuity measure.

11. The system of claim 7 wherein the data protection solutions for each of the plurality of hardware components is recorded in the metadata.

12. The system of claim 11 wherein the data protection solution for each of the plurality of hardware components maintains the location of backup file data in accordance with a backup file retention period.

13. A non-transitory computer readable medium having stored thereon executable instructions which, when executed by a processor of a computer, cause the computer to perform steps comprising:
    capturing metadata specifying both a data protection policy applied to an enterprise application supported by a host computing system and a location of backup file data associated with the enterprise application;

transferring the enterprise application and the metadata from the host computing system to a target computing system; and utilizing the metadata to reconstruct the data protection policy for the transferred enterprise application on the target computing system, wherein the metadata specifies a data protection solution for each of a plurality of hardware components supporting the transferred enterprise application on the target computing system, wherein the target computing system includes a data protection policy management module that is configured to assess whether the plurality of hardware components on the target computing system is able to implement the data protection policy by comparing requirements included in the data protection policy with available physical resources in the target computing system, and wherein the data protection policy management module is configured to reconstruct the data protection policy by designating the available physical resources in the target computing system to support the transferred enterprise application and to comply with the data protection policy.

14. The computer readable medium of claim 13 wherein each of the host computing system and the target computing system is a converged infrastructure (CI) system.

15. The computer readable medium of claim 13 comprising utilizing the transferred metadata to restore at least a portion of the transferred enterprise application on the target computing system.

16. The computer readable medium of claim 13 wherein the data protection policy comprises, for each of the plurality of hardware components, a data protection solution that comprises at least one of a periodic backup, a synchronous data replication process, an asynchronous data replication process, or a business continuity measure.

17. The computer readable medium of claim 13 wherein the data protection solutions for each of the plurality of hardware components is recorded in the metadata.

* * * * *